(12) United States Patent
Wang

(10) Patent No.: US 11,263,786 B2
(45) Date of Patent: Mar. 1, 2022

(54) DECODING DATA ARRAYS

(71) Applicant: Arm Limited, Cambridge (GB)

(72) Inventor: Jian Wang, Skane (SE)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/802,901

(22) Filed: Feb. 27, 2020

(65) Prior Publication Data
US 2021/0272327 A1 Sep. 2, 2021

(51) Int. Cl.
*G06T 9/40* (2006.01)
*G06T 1/60* (2006.01)

(52) U.S. Cl.
CPC . *G06T 9/40* (2013.01); *G06T 1/60* (2013.01)

(58) Field of Classification Search
CPC .................................. G06T 9/40; G06T 1/60
See application file for complete search history.

(56) References Cited

U.S. PATENT DOCUMENTS 5,058,144 A * 10/1991 Fiala ................... H03M 7/3084
375/240
8,542,939 B2 9/2013 Nystad

* cited by examiner

*Primary Examiner* — Ryan R Yang
(74) *Attorney, Agent, or Firm* — Vierra Magen Marcus LLP

(57) ABSTRACT

When decoding a data array that has been encoded using a tree structure representation, the encoded tree representation of the array of data elements comprising a set of tree node data representing the respective node values for the different nodes of the tree and a set of bit count data indicating the number of bits that has been used for signalling the node values for each non-root node in the tree a data value for a set of one or more data elements associated with a first node of the tree structure is determined by determining an initial data value for the first node using the stored tree node data, and modifying the initial data value using a modifier value based on the number of bits used for signalling the node values for the child nodes of the first node in at least the next level of the tree.

17 Claims, 5 Drawing Sheets

DECODING DATA ARRAYS

BACKGROUND

The technology described herein relates to a method of and apparatus for determining data values for use by a data processing system from data that has been encoded, e.g., in a compressed format, and in particular to a method of and apparatus for determining data values for use by graphics processing systems from encoded, e.g., image data such as compressed texture data.

It is common in graphics processing systems to generate colours for sampling positions in the image to be displayed by applying so-called textures, or texture data, to the surfaces to be drawn. For example, surface detail on objects may be generated by applying a predefined "texture" to a set of polygons representing the object, to give the rendered image of the object the appearance of the "texture". Such textures are typically applied by storing an array of texture elements or "texels", each representing given texture data (such as colour, luminance, and/or light/shadow, etc. values), and then mapping the texels onto the corresponding elements, such as (and, indeed, typically) a set of sampling positions, for the image to be displayed. The stored arrays of texture elements (texture data) are typically referred to as "texture maps".

Such arrangements can provide higher image quality, but the storage and accessing of the texture data in use can place relatively high storage and/or bandwidth requirements on a graphics processing device (or conversely lead to a loss in performance where such requirements are not met). This is particularly significant for mobile and handheld devices that perform graphics processing, as such devices are inherently limited in their, e.g., storage, bandwidth and power resources and capabilities.

It is known therefore to encode and store/transmit such texture data in a "compressed" form so as to try to reduce the storage and/or bandwidth burden that may be imposed on a device.

Of course similar considerations apply to various other instances of data processing where it is desired to reduce the amount of data needed for the storage and/or transmission of a certain piece of information.

When it is desired to use such data that has been stored in such a compressed form, the compressed data must then be decoded, e.g. in order to determine a representation of the original (i.e. uncompressed) data values that can then be used by the data processing system.

For example, when the encoded data represents a set of texture data, the encoded texture data can be passed to a suitable decoding circuit in order to extract the texture data (e.g. the colour, luminance, and/or light/shadow, etc. values). The extracted texture data is then passed to the graphics processor and used thereby, e.g., when generating a render output (which may, e.g., comprise a frame for display).

However, the Applicants believe that there remains scope for improved arrangements for processing encoded data.

BRIEF DESCRIPTION OF THE DRAWINGS

Various embodiments of the technology described herein described herein will now be described by way of example only and with reference to the accompanying drawings, in which.

Like reference signs represent like elements.

Figure 1:
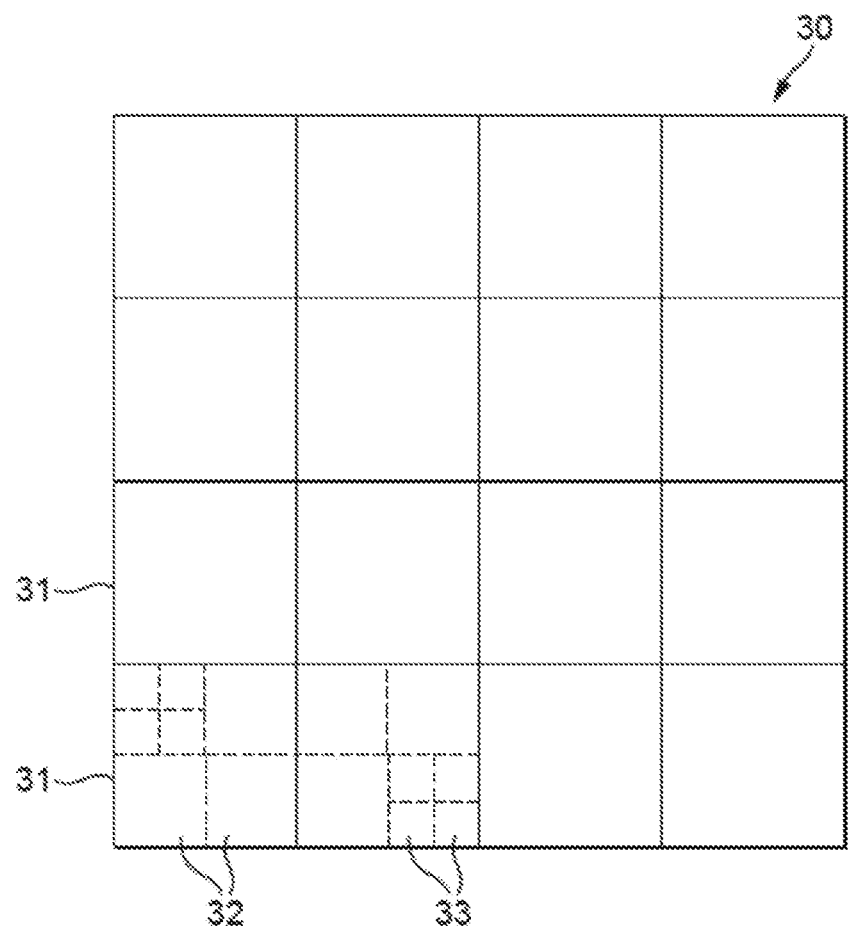
FIG. 1 shows schematically an array of data that may be encoded in accordance with an embodiment of the technology described herein.

As will be appreciated by those skilled in the art there may be other elements of the data processing apparatus and system that are not illustrated in the drawings. It should also be noted here that the drawings are only schematic, and that, for example, in practice the shown elements may share significant hardware circuits, even though they are shown schematically as separate elements in the drawings (or, conversely, where elements are shown as sharing significant hardware circuits, these may in practice comprise separate elements).

DETAILED DESCRIPTION

A first embodiment of the technology described herein comprises a method of determining a data value for a data element or set of data elements of an array of data elements from an encoded representation of the array of data elements, wherein the encoded representation of the array of data elements represents the array of data elements using a tree structure, the tree structure including a plurality of branches associated with a respective plurality of leaf nodes, and each branch extending over a plurality of levels from a root node at a top level of the tree to the respective leaf node of the branch at the lowest level of the tree, such that each leaf node has a set of one or more preceding parent node(s) in the branch of the tree that the leaf node belongs to, the tree being configured such that each leaf node of the tree represents a respective data element of the data array, and the node values for the nodes at each level of the tree being set such that the data value that the tree indicates for the data element of the data array that a leaf node of the tree represents is determined as a function of the node values in the tree for the leaf node and the preceding parent node(s) in the branch of the tree that the leaf node belongs to, wherein the encoded representation of the array of data elements comprises a set of tree node data representing the respective node values for the different nodes of the tree and a set of bit count data indicating the number of bits that has been used for signalling the node values for each non-root node in the tree, the method comprising:

determining a data value for use by a data processing system for a set of one or more data elements associated with a first node of the tree structure representing the array of data elements, the first node having a plurality of child nodes in the tree and the first node thereby being associated with a set of one or more data elements, wherein the data value for the set of one or more data elements associated with the first node is determined by:

using the stored bit count data to determine the number of bits used for signalling the node values for child nodes of the first node in at least the next level of the tree;

using the stored tree node data for the first node and all of its preceding parent node(s) in the tree to determine an initial data value for the first node, the initial data value for the first node being determined as a function of the node values for the first node and all of its preceding parent node(s) in the tree; and determining a data value for use by a data processing system for the set of one or more data elements associated with the first node by modifying the initial data value for the first node obtained from the node values for the first node and all of its preceding parent node(s) in the tree using a modifier value based on the determined number of bits used for signalling the node values for the child nodes of the first node in at least the next level of the tree.

A second embodiment of the technology described herein comprises a decoder for determining a data value for a data element or set of data elements of an array of data elements for use in a data processing system from an encoded representation of the array of data elements, wherein the encoded representation of the array of data elements represents the array of data elements using a tree structure, the tree structure including a plurality of branches associated with a respective plurality of leaf nodes, and each branch extending over a plurality of levels from a root node at a top level of the tree to the respective leaf node of the branch at the lowest level of the tree, such that each leaf node has a set of one or more preceding parent node(s) in the branch of the tree that the leaf node belongs to, the tree being configured such that each leaf node of the tree represents a respective data element of the data array, and the node values for the nodes at each level of the tree being set such that the data value that the tree indicates for the data element of the data array that a leaf node of the tree represents is determined as a function of the node values in the tree for the leaf node and the preceding parent node(s) in the branch of the tree that the leaf node belongs to, wherein the encoded representation of the array of data elements comprises a set of tree node data representing the respective node values for the different nodes of the tree and a set of bit count data indicating the number of bits that has been used for signalling the node values for each non-root node in the tree, the decoder comprising:

a bit count reading circuit configured to:

for a first node of the tree structure representing the array of data elements, the first node having a plurality of child nodes in the tree and thereby being associated with a set of one or more data elements of the array of data elements represented by the tree, use the stored bit count data to determine the number of bits used for signalling the node values for child nodes of the first node in at least the next level of the tree; and a decoding circuit configured to:

use the stored tree node data for the first node and all of its preceding parent node(s) in the tree to determine an initial data value for the first node, the initial data value for the first node being determined as a function of the node values for the first node and all of its preceding parent node(s) in the tree; and determine a data value for use by a data processing system for the set of one or more data elements associated with the first node by modifying the initial data value for the first node obtained from the node values for the first node and all of its preceding parent node(s) in the tree using a modifier value based on the determined number of bits used for signalling the node values for the child nodes of the first node in at least the next level of the tree.

The technology described herein relates to techniques for determining (decoded) data values for an array of data elements (which may, e.g., be an array of texture data for use in graphics processing) that has been encoded using a "multi-level" encoding scheme wherein the data values are encoded and stored using a tree representation in which each leaf node of the tree represents a respective data element of the data array, and in which the data values for nodes at one level of the tree are encoded by reference to the data value of a parent node in the previous level of the tree, and so on, up to a root node at the top level of the tree.

In particular, as will be explained further below, the technology described herein relates to techniques for determining estimates for data values for data elements or sets of data elements of the data array, at a desired level of reproduction (approximation), directly from the tree representation, but using only part of the encoded data, i.e. and without having to extract and process the full encoded 'payload' (all of the tree node values down to the leaf nodes).

In an embodiment, the node values for the nodes of the tree are set such that the data value for the data element of the data array that a leaf node of the tree represents is given by the sum of the node values in the tree for the leaf node and each preceding parent node in the branch of the tree that the leaf node belongs to (in other words, to reproduce the data value for a data element that a leaf node of the tree represents, the value for the leaf node in the tree and the values for all the parent nodes in the tree along the branch in the tree that the leaf node resides on must be added together).

Representing the data array using a tree of this form facilitates using less data to represent the data array (and thereby compressing the data array relative to its original form). For example, it transforms the data array into a format that can facilitate efficient entropy coding.

Moreover, the compression can be lossless, because the tree can be configured such that the original value of the data element that each leaf node corresponds can be reproduced exactly (and the decoding techniques of the technology described herein are in an embodiment used in conjunction with such lossless encoding, although this would not be necessary, and the tree could be configured, e.g., such that the node values along a particular branch of a tree are set to give only an approximation of the data value for the data element represented by the leaf node of the branch in question).

In particular, because the values of the nodes in the tree are such that the data value that a leaf node represents (corresponds to) is indicated by the sum of the node values for the leaf node and the values of all the preceding parent nodes on the branch of the tree that the leaf node resides on, each node of the tree can effectively be set to a "minimum" node data value that can still allow the correct leaf node values to be determined. The tree can thus be thought of as a "minimum value" tree representation of the data array, and this "minimum value" tree representation can facilitate a compressed version of the original data array, because rather than storing, for example, the actual, original data array values for each data element in the array, a set of "minimum"

values from which the actual, original data array values can be determined is stored instead.

By summing (all of) the tree node values along the branch to which a particular leaf node belongs to it is therefore possible to determine the data value for the data element represented by the leaf node in question.

An example of this type of encoding scheme is described, e.g., in U.S. Pat. No. 8,542,939 (Arm Limited), which is incorporated herein by reference in its entirety, and in general the technology described herein may be used in conjunction with an encoding scheme as described in that reference, in any of its arrangements and examples.

However, whilst various embodiments will be described with reference to such "minimum value" tree representation, it will be appreciated that the technology described herein may equally be applied to other suitable "multi-level" encoding schemes wherein an array of data elements is encoded using a tree structure, and wherein the tree node values at each level are encoded with reference to the other levels. Thus, in general, the node value for a particular node in the tree representation used in the technology described herein may be encoded with reference to its parent node(s) in the tree using any suitable function relating the tree node values at one level to the node values for the parent node(s) in the previous level(s), as desired. The tree node values do not therefore need to be "minimum" values, as described above (although in embodiments they are), and in some embodiments may, for example, comprise maximum, average, etc., values. In that case, in a similar fashion as described above, the tree node values can be set such that the data value that the tree indicates for the data element of the data array that a leaf node of the tree represents is determined as a function of the node values in the tree for the leaf node and the preceding parent node(s) in the branch of the tree that the leaf node belongs to, whatever that function is. For example, determining the data value for a leaf node may involve adding/subtracting the data values along the branch in an appropriate fashion. Various arrangements would be possible in this regard.

When it is desired to use some or all of the data that has been encoded in this way, the encoded data must then be processed, e.g. by working through the tree representation, to extract the data values for the data elements of interest, which data values can then be used by (and output to) the data processing system as desired.

In the technology described herein, and as described in U.S. Pat. No. 8,542,939, there is stored together with the set of data representing the node values for the nodes in the tree representation, a set of "bit count" data indicating the number of bits that has been used for signalling the node values for each node in the tree. This bit count data may facilitate more efficient encoding/decoding of the stored data representing the node values. For example, in order to more efficiently compress and store the tree node data, the node values for the different, respective nodes in the tree are in an embodiment stored in a compressed form using variable-size fields (e.g. depending on the amount of data required to store the node value for a particular node), and this tree node data is in an embodiment stored in a contiguous fashion. In that case, the bit count data allows the tree node data for the different nodes to be identified, and processed accordingly.

As explained above, when it is desired to determine the data value for some or all of the data elements of the data array that has been encoded in this way, it is possible to work through the tree accordingly, extracting the node values for the nodes in the tree (e.g. using the bit count data), and to determine the data value for each desired data element as a function of the tree node values along the branch of the tree to which the leaf node representing the data element in question belongs. In this way, data values can be determined for any (and all) of the data elements of the original data array that are represented by the respective leaf nodes of the tree (and at least in some embodiments this encoding/decoding is performed in a lossless fashion such that the original data array can be reproduced exactly).

Thus, it is possible to process the encoded representation to obtain a (in an embodiment lossless) reproduction of the original data array that was encoded.

For example, whilst embodiments have been described above in relation to determining a data value for a single leaf node, representing a particular data element of the original data array, it will be appreciated that the tree can be processed to determine data values for each of the leaf nodes (i.e. for each data element of the original data array) in order to reproduce the original data array.

Being able to fully reproduce the original data array may be desired in many circumstances. However, the present Applicants have now recognised that in some cases it may be (e.g. additionally) desirable to determine only an approximate, e.g. a 'downscaled', reproduction of the original data array. For example where the original data array comprises a 16×16 array of data elements, it may be desired to fully decode the encoded representation in order to determine data values for each of the individual data elements to reconstruct the original 16×16 array. However, in some cases it may be desired, or additionally desired, to determine a downscaled 8×8, 4×4, etc., reproduction of the original data array.

An example of this would be for the case where the array of data elements represents an array of texture data that is to be used, e.g., by a graphics processor when generating a render output. For instance, when processing such texture data, it is known to store a series of progressively lower resolution (i.e. downscaled) representations of the same image (referred to as texture "mipmaps") in order to improve the rendering speed and/or reduce the processing burden on the renderer (circuit) of the graphics processor. This approach means that higher-resolution mipmap images can be used for higher density samples, such as for objects in the near-field of the image, which may be desired to be rendered in full detail. However, when full detail is not required, the renderer can instead switch to a suitably lower-resolution mipmap, for which the processing requirements (e.g. the number of texels to be processed per pixel) are lower than for the full detail image, and which can therefore be rendered more quickly and/or using less processing power.

Embodiments of the technology described herein, in effect, allow such downsampled representations of the original array of data elements (e.g. texture mipmaps where the array is an array of texture data) to be obtained for 'free', i.e. directly from the tree representation. This is achieved in the technology described herein by estimating a data value to be used for a child node (or set of child nodes) at a particular level of the tree based on the node values for the preceding parent nodes in the tree (but not using the node value for the child node(s) in question), and then using the bit count data for the child node(s) at least at the level of the tree in question (and in embodiments also the bit count data for any lower-level child nodes in the tree going down to the level of the leaf nodes) to approximate the contribution from the child node(s) in question, in a manner that will be described further below.

For instance, as explained above, the tree structure is configured such that each data element is represented by a leaf node of the tree. Each leaf node is associated with a respective branch extending from the leaf node to a root node of the tree. Each branch thus contains a leaf node and one or more preceding parent node(s). The tree structure is arranged such that the parent nodes (at the higher levels of the tree) will typically be shared for a plurality of leaf nodes. A given node at any level of the tree above the level of the leaf nodes thus typically has a plurality of child nodes in the tree (going down to the level of the leaf nodes), and is thereby associated with a set of one or more data elements in the data array (i.e. the data elements represented by the leaf nodes at the end of the branches to which the non-leaf node belongs).

For example, in embodiments, the tree structure comprises a "quadtree", as will be explained below. In that case, the leaf nodes at the bottom level of the tree are each associated with a single data element, and the nodes at the next level in the tree are each associated with four child leaf nodes, and therefore represent four data elements in the original data array, and so on.

The technology described herein thus uses the tree structure to obtain an estimated data value for a particular data element or set of data elements associated with a node at any level of the tree to be obtained, and can thereby be used to obtain a reproduction of the original data array at various levels of reproduction (i.e. downscaling). For instance, in this way, downscaled reproductions can be obtained for every level of the tree going up to the root node at the top of the tree.

In the technology described herein this is done by determining an initial data value for a first node in the tree, having a plurality of child nodes, using the tree node values for the first node and all of its preceding parent node(s) (there may be no preceding parent nodes if the first node is the root node), and then modifying the initial data value for the first node using a suitable modifier value based on the number of bits used for signalling the node values for the child nodes of the first node in at least the next level of the tree.

In embodiments, the modifier value is determined based on the number of bits used for signalling the node values for all of the child nodes of the first node in the tree (including child nodes of child nodes, etc.) down to the level of the leaf nodes. For instance, when a modifier value is determined using only the bit count data for the child nodes in the level immediately below the first node, if there were a lower level node having a relatively larger contribution, this would be missed, and there may be relatively larger approximation error. Thus, in an embodiment, the modifier value is determined using the maximum bit count value based on the respective bit count data for all child nodes of the first node (including child nodes of child nodes, etc.) down to the level of the leaf nodes.

However, in some embodiments, the modifier value may be determined based on the number of bits used for signalling the node values for the child nodes of the first node in the next level of the tree (only). For example, depending on how the bit count data is stored, this may provide a sufficient approximation for the contribution from the nodes in the lower levels of the tree. This will also be the case, for instance, where the child nodes in the level below the first node are the leaf nodes (since in that case the child nodes in question are at the lowest level of the tree). Depending on how the bit count data is stored, this may provide a sufficient approximation for the contribution from the nodes in the lower levels of the tree. Various arrangements would be possible in this regard. For instance, it would also be possible to use bit count data for child nodes for only some of the levels in the tree, but not necessarily all the way down to the level of the leaf nodes.

The initial data value for the first node is in an embodiment obtained using the same function that is used when determining the 'full' value, i.e. for a leaf node at the end of a branch. For example, in an embodiment, as described above, the data value for a particular data element represented by a leaf node in the tree can be obtained by summing all of the tree node values for the nodes in the branch of the tree to which the leaf node belongs (including the value for the leaf node itself). In such embodiments, in order to determine an estimate of the data value for a first node in the manner of the technology described herein, an initial data value for the node is in an embodiment obtained by summing the node values for the first node and all of the preceding parent node(s) of the first node in the tree.

The initial data value thus represents in effect a "minimum" value for the child nodes of the first node in question. In the usual ('full') decoding scheme, this minimum value would then be refined to determine the data values for each of the child nodes of the first node, and hence the data elements represented by the leaf nodes at the end of the branches to which the node in question belongs by then adding the contributions (node values) from the child nodes of the first node and any other lower nodes in the tree down to the level of the leaf node.

In contrast, in embodiments of the technology described herein, rather than summing all of the node values down the level of the leaf nodes to determine data values for the individual data elements, the sum is truncated at the level of the first node (i.e. above the level of the child nodes in question), and the additional contribution from the child nodes (and indeed from any other lower nodes in the tree down to the level of the leaf nodes) is then approximated based on the bit count data (i.e. the number of bits used to signal the node value for the child nodes).

For example, in an embodiment, a data value, C, for a set of child nodes of a first node in the tree is approximated using a function: $C=MIN+0.5*BC\_MAX$, where MIN is a "minimum" data value for the first node obtained by summing the data values for the first node and all of its preceding parent node(s), and BC_MAX is the maximum node value that is representable by the number of bits used for signalling the node value for the child nodes of the first node. Thus, where the bit count data indicates that N=3 bits have been used to signal the node value for the child nodes of the first node, the maximum node value for the child nodes that could be represented would then be $2^N-1=7$. The data value for the child nodes would then be approximated by adding 0.5*7 to the minimum (first) data value obtained by summing the node values for the first node and all of its preceding parent nodes, with appropriate rounding (up/down) being applied to provide an integer data value, as required, to be used for the child nodes. This function effectively takes an 'average' of the additional contribution from the child node (and any lower nodes in the tree).

Thus, in embodiments, the node values for the nodes at each level of the tree are set such that the data value that the tree indicates for the data element of the data array that a leaf node of the tree represents is determined as a sum of the node values in the tree for the leaf node and the preceding parent node(s) in the branch of the tree that the leaf node belongs to, and the modifier value is (based on) half of the maximum value that could be signalled using the respective bit count for the child nodes of the first node.

However, it will be appreciated that any suitable function may be used to provide a suitable modifier value for approximating the contribution from the node in question, e.g. depending on the type of data that is being processed.

For example, if the encoding scheme is not designed to be linear, e.g. where the encoding is performed using a lookup table, or other non-linear function, the modifier value may be selected appropriately to approximate the contribution from the node in question based on the encoding scheme that is being used.

Furthermore, in general, it will be understood that the estimated initial data value for the node may be determined using any suitable function of the node values for the preceding parent nodes, and this need not be a sum. Typically the same function is used to perform this truncated sum as would be used when determining the data value for a leaf node, i.e. when fully decoding the tree. Thus, whilst in an embodiment the estimated initial data value for the first node is determined from a sum of the node values for the first node and all of its preceding parent nodes, in general, the function may be any suitable function, e.g. depending on how the node values in the tree have been set to encode the data values.

Thus, according to the technology described herein, a data value is determined for a set of child nodes of a first node in the tree using an initial data value obtained based on the tree node values for the first node and all of its preceding parent nodes in the tree which is then modified using a modifier value obtained based on the bit count data for the child nodes. The data value obtained for the child nodes in this way can then be used for any data elements in the original data array that are associated with the nodes in question (i.e. any data elements represented by leaf nodes whose respective branch includes the first node and the child nodes in question).

These data values can then be used by (and output to) a data processing system for any of the data elements as required. That is, rather than (or in addition to) providing the fully decoded data values for the individual data elements as output to the data processing system, the estimated data values determined for the child nodes (which estimates typically therefore apply for a plurality of data elements) are provided for output for use by the data processing system.

Again, whilst this determination has been primarily described with reference to the processing of a single (first) node and its respective child nodes, it will be appreciated that data values may be estimated for plural nodes, e.g. for all (child) nodes at a particular level of the tree, to determine a suitably downscaled representation of the original data array that is encoded at that level of the tree.

Accordingly, it is a benefit of the technology described herein that data values can be approximated directly from the encoded representation, at a desired level of reproduction, using only part of the tree node data, i.e. only the data for the nodes in the levels above the level of the child nodes for which a data value is being approximated. For instance, this means that an estimate for the data value can be obtained at the desired level of downscaling in an efficient manner, e.g., without having to work through the entire tree representation and process all of the tree node data (including the tree node values down to the individual leaf nodes representing the data elements). It will be appreciated that due to the structure of the tree the bulk of the processing payload may be associated with the processing of the leaf nodes. Further, when it is desired to use only a downscaled representation of the data array, the information at the level of the leaf nodes is essentially subsequently discarded.

The technology described herein thus allows such downscaled representations of the original data array to be determined directly with very little additional processing cost. For instance, in more conventional schemes, the data values would typically be extracted in full and then a further step of downsampling performed, as desired. This further step of downsampling can be (and in an embodiment is) avoided in the technology described herein wherein downscaled representations are in effect obtained for 'free', i.e. directly from the tree representation.

Although the technology described herein may provide particular benefits in the context of texture data, e.g. by allowing downscaled texture maps ("mipmaps") to be obtained for 'free' directly from the tree representation, e.g. as described above, it will be understood that the technology described herein is not limited to the processing of compressed texture data, and that similar benefits may be achieved when processing various other types of data.

For instance, the ability to obtain a suitable downscaled approximation of an array of data elements may be beneficial in a range of contexts, e.g. especially where processing resource is limited and a full detail reproduction of the original data array is either not needed, or would otherwise be detrimental to the processing performance.

The technology described herein can thus be used for processing an encoded representation of any suitable data array. The data array that is represented in this encoded manner should comprise a plurality of data elements (entries), each occupying different positions in the array. The data array is in an embodiment an image (in an embodiment represents an image). As discussed above, in an embodiment the data array represents a graphics texture, i.e. an array of texture data.

However, the technology described herein is not exclusively applicable to graphics textures, and may equally be used for other forms of data array. For example, the technology described herein may also find utility where the data array that has been encoded comprises frame buffer data (for use as a frame buffer format), e.g. in graphics processing systems and for use with display controllers. Thus, in an embodiment the data array is a frame of data to be stored in a frame buffer, e.g. for display. Various other examples would of course be possible and of course the technology described herein is not limited to processing image data and may find utility for any data that may be suitably encoded, e.g., in the manner described above.

Whilst it would be possible to have a single tree representation for a given data array (e.g. image) to be compressed, in an embodiment, a data array (e.g. image) is divided into plural separate regions or blocks, and a respective tree representation is generated for each different block (region) that the data array is divided into. Thus, in embodiments, the array of data elements that is represented using the tree corresponds to a "block" within an overall data array, e.g. representing an image. The encoded representation may thus represent and store data for such a block of data elements within an overall, larger array of data elements.

The blocks (regions) that the overall data array (e.g. texture) is divided into for encoding purposes in these arrangements can take any suitable and desired form. Each block should comprise a sub-set of the data elements (positions) in the array, i.e. correspond to a particular region of the array. In an embodiment the array is divided into non-overlapping and regularly sized and shaped blocks. The blocks are in an embodiment square, but other arrangements could be used if desired. The blocks in an embodiment correspond to a block size that will otherwise be used in the data processing system in question. Thus, in the case of a tile-based graphics processing system, the blocks in an embodiment correspond to (have the same size and configuration as) the tiles that the rendering process of the graphics processing system operates on.

(In tile-based rendering, the two dimensional output array of the rendering process (the "render output") (e.g., and typically, that will be displayed to display the scene being rendered) is sub-divided or partitioned into a plurality of smaller regions, usually referred to as "tiles", for the rendering process. The tiles (sub-regions) are each rendered separately (typically one after another). The rendered tiles (sub-regions) are then recombined to provide the complete output array (frame) (render target), e.g. for display.

Other terms that are commonly used for "tiling" and "tile based" rendering include "chunking" (the sub-regions are referred to as "chunks") and "bucket" rendering. The terms "tile" and "tiling" will be used herein for convenience, but it should be understood that these terms are intended to encompass all alternative and equivalent terms and techniques.)

In an embodiment, the overall data array is divided into 16×16 blocks (i.e. blocks of 16×16 array positions (entries)). In one such arrangement, a single tree representation is generated for the 16×16 block. Thus, in the case of a texture map, for example, a separate tree representation would be generated for each (non-overlapping) 16×16 texel region of the texture map, and in the case of a frame for the frame buffer, a tree representation would be generated for each 16×16 pixel or sampling position region of the frame.

Other arrangements would, of course, be possible. For example, instead of providing a single tree representation for a 16×16 block, four trees, each representing an 8×8 or a 16×4 block within the 16×16 block could be provided (in effect therefore, the data array would be divided into 8×8 or 16×4 blocks).

The data array element data values that the tree represents and indicates, i.e. that can be derived from the tree, can take any suitable and desired form, and will depend, as will be appreciated by those skilled in the art, upon the nature of the data array being compressed, e.g. whether it is a texture, a frame for the frame buffer, etc.

In the case of a texture, for example, the data array element data values that the tree represents and indicates should be data values to allow appropriate texture data (texel values) for the data array elements that the tree leaf nodes represent to be determined. Such texture data could comprise, e.g., a set of colour values (Red, Green, Blue (RGB), a set of colour and transparency values (Red, Green, Blue, Alpha (RGBa)), a set of luminance and chrominance values, a set of shadow (light)-map values, a set of a normal-map (bump-map) values, z values (depth values), stencil values, luminance values (luminance textures), luminance-alpha-textures, and/or gloss-maps, etc.

In the case of a frame for display, to be stored in a frame buffer, the data array element data values that the tree represents and indicates should be data values to allow appropriate pixel and/or sampling position data values for the data array elements that the tree leaf nodes represent to be determined. Such pixel data could comprise, e.g., appropriate colour (RGB) values, or luminance and chrominance values.

Where the data elements of the data array have plural components (channels) associated with them, such as would be the case, for example, for RGBa textures (in which each data element will have four values associated with it), then in an embodiment a separate tree is generated (and stored) in respect of each different data component (channel). Thus, for example, in an embodiment a separate tree is constructed for each different component of the data elements in the data array, e.g. for each of the three or four colour components that are present in the original data array. (In other words, a given tree in an embodiment represents the values of only one component (channel) of the data elements of the data array.)

The tree or trees representing the data array can be generated and stored in any suitable and desired manner. Each node of the tree will in an embodiment have plural child nodes, each representing a respective non-overlapping and equal-sized region of the region of the data array that the parent node represents, save for the end leaf nodes that represent the individual data elements themselves.

In an embodiment, the tree representations are in the form of quadtrees, i.e. one or more quadtrees are generated to represent the data array. However, other tree structures, i.e. having greater or fewer than four children per node could be used if desired. It would also be possible to use a hybrid tree structure, for example that is a quadtree but which only has two children per node for the next to lowest layer (i.e. the leaf node parent nodes only have two child leaf nodes each).

Where the data array is represented using a quadtree or quadtrees, then each quadtree will accordingly have a root node representing the whole of the block or region of the data array that the quadtree is encoding (or the whole of the data array where a single quadtree is to be generated for the entire data array). The root node will then have four child nodes (as it is a quadtree), each representing a respective non-overlapping and equal-sized region (and in an embodiment a quadrant) of the block of the data array that the root node (that the quadtree) represents. Each child node of the root node will then have four child nodes, each representing a respective non-overlapping and equal-sized region (and in an embodiment a quadrant) of the region of the data block that the child node of the root node (that the quadtree) represents, and so on (i.e. with each node having four child nodes, each representing a respective non-overlapping and equal-sized region of the block of the data array that the parent node represents), down to the leaf nodes that represent individual data elements (e.g. texels or pixels) of the data array.

The decoding of the technology described herein may thus be applied to nodes at any level of the tree from the root node down to the nodes at the level above the leaf nodes, in order to obtain a suitable downscaled representation of the array of data elements.

As discussed above, the (or each) tree, e.g. quadtree, should be generated such that each leaf node of the tree corresponds to a given data element (e.g. texel or pixel) of the data array. Thus there will be one leaf node in the tree for each data element in the block (region) of the data array that the tree is to represent.

Each node of the tree (e.g. quadtree) should have a respective node value associated with it. As discussed above, the node values for the nodes of the tree are set such that the data value for the data element of the data array that a leaf node of the tree represents is given by a function, e.g. which may be a sum, of the node values in the tree for the leaf node and of each preceding parent node in the branch of the tree that the leaf node belongs to. Thus, the data-value that is associated with and stored for each node of the tree will be (and is in an embodiment) the value that is needed to reproduce the desired leaf node values when all the node values along the branches of the tree are processed (e.g. summed) together in the appropriate fashion.

Thus, for example, in the case of a quadtree for a 16×16 data element block, there will be a root node representing the whole 16×16 block (i.e. the 'top' level of the tree). The root node will have four child nodes, each representing an 8×8 block of data elements within the 16×16 block (i.e. the next level of the tree). Each such child node will have four child nodes, each representing a 4×4 block of data elements with the 8×8 block in question, and so on, down to the leaf nodes that represent the individual data elements (at the lowest level of the tree).

As explained above, the technology described herein allows data values to be estimated at any desired resolution, i.e. level of the tree, directly from the tree representation without having to fully process the tree. Of course, it would still be possible in conjunction with this to process the tree in its entirety to determine data values for the individual data elements, e.g. in the usual way.

In fact, the present Applicants have further recognised that in some cases the approach described above, wherein the data values for child nodes at a particular level of the tree are approximated using the respective bit count data, may not be appropriate. In that case, it may be more desirable to decode (at least) the next level of the tree in order to determine the individual data values for the child nodes in question.

For instance, the present Applicants recognise that the accuracy of the estimation described above will depend on the bit count for the child nodes in question (as well as the bit count for any other lower level nodes in the tree, depending on how the bit count data is stored). In particular, where the bit count is relatively higher, the accuracy of the estimation may be relatively low, and attempting to approximate the contribution of a child node based on some function of its bit count may introduce undesirably large errors. In such cases it may be better therefore to decode the next one or more lower level(s) of the data array to determine data values for the child nodes in question (and to potentially then perform subsequent downsampling, if required, in a more conventional fashion).

Thus, in embodiments, the method comprises checking the number of bits used for signalling the node values for child nodes of the first node, and wherein when the number of bits used for signalling the node values for child nodes of the first node is less than or equal to a threshold value, proceeding to use the stored tree node data to determine the initial data value for the first node, and to determine the data value for the child nodes of the first node by modifying the initial data value using a modifier value based on the number of bits used for signalling the node values of the child nodes for the first node in at least the next level of the tree, e.g. in the manner described above.

This threshold checking may be performed using the bit count data for the child nodes in the next level of the tree (only), but is in an embodiment performed using the bit count data for child nodes of the first node for all levels of the tree down to the level of the leaf nodes. For example, if the child nodes in the level of the tree below the first node are not leaf nodes, using only the bit count data for those child nodes may result in large approximation errors, especially if there are lower level child nodes having relatively larger bit counts.

Thus, in an embodiment, the step of checking the number of bits used for signalling the node values for child nodes of the first node comprises checking the number of bits used for signalling the node values for all lower level nodes associated with the first node (e.g. child nodes of child nodes) down to the level of the leaf nodes. Where the bit counts are less than or equal to the threshold, the data values for the child nodes can then be approximated using the maximum bit count value determined from the bit count data for all of the child nodes down to the level of the leaf nodes.

On the other hand, when the number of bits used for signalling the first node is greater than the threshold value, the method in an embodiment comprises determining individual data values for the child nodes of the first node as a function of the child node value and the node values of the preceding parent nodes in the tree.

Thus, in embodiments, a determination may be made as to whether to apply the decoding scheme of the technology described herein to estimate data values for a set of child nodes at a particular level of the tree, or whether to perform a more conventional ('full') decoding scheme to determine the data values for the child nodes at that level. In an embodiment this determination is made on a "per node" basis in dependence on the bit count for the nodes in question. In particular, when it is desired to obtain a data value for a set of data elements associated with a given first node in the tree, the number of bits used for signalling the node values for the child nodes of the first node may first be checked, and (only) when the number of bits used for signalling the node values for the child nodes of the first node is less than or equal to a predetermined threshold value, does the decoding proceed to determine approximate data values for the child nodes in the manner described above i.e. by using the stored tree node data to determine an initial data value for the first node, and then modifying the initial data value using a modifier value based on the number of bits used for signalling the node values for the child nodes of the first node. On the other hand, when the number of bits used for signalling the first node is greater than the predetermined threshold value, the decoding may instead proceed to decode (at least) the next level of the tree to determine individual data values for the child nodes of the first node.

In embodiments, the tree may be fully decoded to determine data values for at least some of the data elements of the data array associated with the node in question. For instance, in that case, a data value for the or some of the data elements of the data array that are associated with the first node may be determined as a function of all of the node values along the branch(es) to which the leaf node(s) representing the data element(s) belong.

The data values (e.g. difference values) that are stored for each node of the tree in the stored representation of the tree can be arranged and configured in any suitable and desired manner in the stored representation of the tree.

In the technology described herein, the arrangement is such that individual node values or sets of individual node values can be extracted from the stored data representing the tree, without, e.g. having to decode the entire set of the data. This then facilitates random access to original data element values or to sets of original data element values that the stored tree represents.

In an embodiment, where each tree is a quadtree and represents a 16×16, 16×4, or 8×8 block of data elements, the arrangement is such that individual 4×4 blocks can be decoded without having to decode any other 4×4 blocks, and such that 16×16, 16×4 or 8×8 blocks can be decoded independently of other 16×16, 16×4, or 8×8 blocks, respectively. In this arrangement, the minimum granularity will be decoding a single 4×4 block. This is acceptable and efficient, as this will typically correspond to the minimum amount of data that can be fetched from memory in one operation in typical memory subsystems.

To facilitate this, as described above, there is stored together with the set of data representing the tree node values, a set of data that allows the individual node values to be identified from within the set of tree node data, with this node identifying data being provided in the form of a set of bit count data indicating the number of bits (a bit count) used for signalling the node values for each of the nodes in the tree.

This may, for example, facilitate a more efficient compression by allowing the node values (e.g. the difference values) for the nodes of a tree representing all or part of the data array to be stored in variable-sized fields within the set of data representing the tree node values, e.g. in a contiguous fashion. This can allow the data representing the tree to be stored in a more compressed form. The bit count data is then used by the decoder to identify the data for each respective tree node in the set of data indicating the tree node values.

The data indicating the number of bits (the bit count) used in the stored representation of the tree to signal the, e.g. difference, values for each node of the tree can be arranged and configured in the data representing the tree in any desired and suitable manner. However, in an embodiment, it too is arranged as a tree representation, with the nodes of the "bit count" tree indicating the number of bits used in the set of data indicating the tree node values for corresponding nodes in the tree representing the data array.

Thus, in an embodiment, the data representing the tree representing the data array that is generated and stored in the technology described herein comprises tree node data indicating node values for the tree representing the data array, and bit count data representing a tree that indicates the number of bits (the bit count) used to indicate the respective node values in the data indicating the node values for the tree representing the data array.

The data representing the bit count tree could store for each node in the bit count tree, the "true" bit count (the number of bits) used for representing the data values for the corresponding nodes in the data representing the node values of the tree representing the data array. However, in an embodiment, the data representing the bit count tree represents the bit count tree in an encoded form such that the data representing the bit count tree (that is stored to represent the bit count tree) is an encoded representation of the bit count tree.

For example, in an embodiment, the bit count tree is encoded for storage by storing for the bit count tree nodes other than the root node, the difference between the bit count value (i.e. the number of bits the node is to indicate) for the node in the bit count tree and the bit count value of its parent node in the bit count tree.

In other words, in an embodiment a "bit count" tree indicating the amount of bits used to signal the tree node values (e.g. difference values, as discussed above) in the stored representation of the tree is generated and then data representing that "bit" count tree is stored and maintained in parallel with the set of data representing (indicating) the tree node values (and from which the values of the data array elements that the tree represents will be determined).

In these embodiments, the "bit count" tree or trees can be configured in any suitable and desired manner. The bit count tree or trees in an embodiment have the same or a similar configuration to the tree (or trees) representing the data array (but in an embodiment with one level of nodes less than the corresponding tree representing the data array). Thus, where one or more quadtrees are used to represent the data array, the bit count trees are in an embodiment also in the form of quadtrees. Thus, in an embodiment, the bit count tree(s) are in the form of quadtrees (in which case each node of a bit count quadtree will have four child nodes, save for the end leaf nodes of the quadtree). It would also be possible, e.g., to have bit count trees that are more or less sparse than the tree (or trees) representing the data array.

The data-value that is associated with and stored for a node of the bit count tree is in an embodiment a value that can be used either on its own, or in combination with other node values in the bit count tree, to determine the number of bits used to signal the value of a corresponding node or nodes in the tree representing the data array in the set of data representing the node values of the tree representing the data array.

In an embodiment, the bit count tree (or trees) is configured such that each node of the bit count tree indicates the number of bits used to signal the node value for each child node of a corresponding parent node of the tree representing the data array that is indicated in the data representing the tree representing the data array. Thus, for example, a bit count tree node value of 3 will indicate that three bits have been used for each child node value (have been used to signal each child node value) that is (explicitly) indicated in the data representing the tree representing the data array of the node of the tree representing the data array that the bit count tree node corresponds to.

Accordingly, in an embodiment, the same number of bits is used for each child node (is used to signal the value of each child node) of a given parent node of the tree representing the data array whose value is indicated in the set of data representing the node values of the tree representing the data array, and it is that same number of bits that a given (and the appropriate) node in the bit count tree indicates.

The values (e.g. difference values) that are stored for the nodes of the bit count tree in the stored (e.g. compressed) representation of the bit count tree can be arranged and configured in any suitable and desired manner in the stored representation of the bit count tree.

In an embodiment, the arrangement is such that individual node values or sets of individual node values can be extracted from the stored data representing the tree, without, e.g., having to decode the entire set of the data. This then facilitates random access to bit count values or to sets of bit count values that the stored bit count tree represents. To achieve this, in an embodiment, the data values for the non-root nodes in the bit count tree are indicated in the data representing the bit count tree using fixed size fields (e.g. using a 2-bit signed value) in the data representing the bit count tree. Thus, in an embodiment the value for each non-root node in the bit count tree whose value is indicated in the data representing the bit count tree is indicated by using the same, fixed number of bits for each such node. This then allows a decoder to readily determine where the relevant bit count tree node values are in the data representing the bit count tree.

It will be appreciated that when decoding the encoded data in accordance with the technology described herein, the stored data representing the data array may be provided, e.g., via a storage medium or over the Internet, etc., to the processor, such as the graphics processor or display controller, that needs to use that data (and the decoding processor will then load the stored data and process it in the manner discussed above).

The apparatus for determining the value of a data element of the data array in a data processing system is in an embodiment incorporated in a graphics processor or a display controller.

The technology described herein also extends to a method and system that both stores and then decodes the data for the data array in the manners discussed above.

The methods and apparatus of the technology described herein can be implemented in any appropriate manner, e.g. in hardware or software, and in (and be included in) any appropriate device or component.

The actual device or component which is used to store the data in the manner of the technology described herein will, for example, depend upon the nature of the data array that is being stored. Thus, for example, in the case of a graphics texture, an appropriate processor, such as a personal computer, may be used to generate and store the textures in the manner of the technology described herein, e.g. by an application developer, and the so-stored textures then provided as part of the content of a game, for example. In the case of the stored data array being a frame for display, then it may accordingly be a graphics processor that generates and stores the data in the manner required.

Similarly, on the data reading (decoding) side of the operation, in the case of texture data, for example, it could be a graphics processor that reads (decodes) the stored data array, and in the case of a frame for display, it could be a display controller for a display that reads (decodes) the stored data array.

In an embodiment the technology described herein is implemented in a graphics processor, a display controller, an image signal processor, a video decoder or a video encoder, and thus the technology described herein also extends to a graphics processor, a display controller, an image signal processor, a video decoder or a video encoder configured to use the methods of the technology described herein, or that includes the apparatus of the technology described herein, or that is operated in accordance with the method of any one or more of the embodiments of the technology described herein. Subject to any hardware necessary to carry out the specific functions discussed above, such a graphics processor, display controller, image signal processor, video decoder or video encoder can otherwise include any one or more or all of the usual functional units, etc., that graphics processors, display controllers, image signal processors, video decoders or video encoders include. In an embodiment, the methods and apparatus of the technology described herein are implemented in hardware, in an embodiment on a single semi-conductor platform.

The technology described herein is particularly, but not exclusively, suitable for use in low power and portable devices. Thus, in an embodiment, the technology described herein is implemented in a portable device, such as a mobile telephone or PDA.

Similarly, the memory where the data representing the tree representing the data array is stored may comprise any suitable such memory and may be configured in any suitable and desired manner. For example, it may be an on-chip buffer or it may be an external memory (and, indeed, may be more likely to be an external memory). Similarly, it may be dedicated memory for this purpose or it may be part of a memory that is used for other data as well. In an embodiment, this data is stored in main memory of the system that incorporates the graphics processor.

In the case of a texture data array, the memory is in an embodiment a texture buffer of the graphics processing system (which buffer may, e.g., be on-chip, or in external memory, as desired). Similarly, in the case of a frame for the display, the memory is in an embodiment a frame buffer for the graphics processing system and/or for the display that the graphics processing system's output is to be provided to.

All the data representing the tree representing the data array is in an embodiment stored in the same physical memory, although this is not essential.

Other memory arrangements would, of course, be possible.

The encoding and decoding apparatuses discussed above may generally be provided as part of a data processing system. For example, the apparatuses may comprise part of an image and/or video processing system that includes a camera, such as a digital camera, mobile phone or tablet.

In general, the processes described herein in any embodiment may be performed by any desired and suitable apparatus. For example, the processes described herein in any embodiment may be performed by an image or video processor (codec). The data processing apparatus described herein in any embodiment may therefore comprise or may be a video processor. Thus, the processing, decoding, bit count reading, etc., circuits/circuitry described herein in any embodiment may form part of a video processor. The data processing apparatus described herein in any embodiment may comprise, or may be, or may form part of, a system on chip (SoC).

As will be appreciated by those skilled in the art, the encoding/decoding apparatus of the technology described herein described herein may be part of an overall data processing system that includes, for example, a host (e.g. central) processor. The host processor may, for example, execute applications that require data processing by the encoding/decoding apparatus. The host processor may send appropriate commands and data to the encoding/decoding apparatus to control it to perform the data encoding/decoding operations and to generate and/or use an output required by applications executing on the host processor. To facilitate this, the host processor may execute a driver for the encoding/decoding apparatus.

In embodiments, the apparatus or system may comprise, and/or may be in communication with, one or more memories and/or memory devices that store the data described herein, and/or store software for performing the processes described herein. The apparatus or system may comprise, and/or may be in communication with a display for displaying images based on the data elements of the arrays. The apparatus or system may comprise, and/or may be in communication with a camera that generates the arrays of data elements.

The memory referred to herein may be any desired and suitable memory of or for the data processing apparatus. The memory may be external to the data processing apparatus, e.g. video processor and/or system on chip (SoC). The memory may be, for example, main system memory.

The technology described herein described herein can be used for all forms of data arrays that a data processing apparatus may provide and/or use, such as images or frames for display. Thus, as indicated above, the arrays of data elements may comprise image data and/or may correspond to images or frames of image data.

In an embodiment, the various functions of the technology described herein described herein are carried out on a single data (e.g. image) processing platform that provides and/or uses the arrays of data elements.

The technology described herein described herein can be implemented in any suitable system, such as a suitably configured computer or micro-processor based system. In an embodiment, the technology described herein described herein is implemented in a computer and/or micro-processor based system.

The various functions of the technology described herein described herein can be carried out in any desired and suitable manner. For example, the steps and functions of the technology described herein described herein can be implemented in hardware or software, as desired. Thus, for example, unless otherwise indicated, the various circuits/ circuitry, functional elements, and stages of the technology described herein described herein may comprise a suitable processor or processors, controller or controllers, functional units, circuits, circuitry, processing logic, microprocessor arrangements, etc., that are operable to perform the various steps or functions, etc., such as appropriately dedicated hardware elements (processing circuits/circuitry) and/or programmable hardware elements (processing circuits/circuitry) that can be programmed to operate in the desired manner.

In particular, it is contemplated that the encoder used to generate the encoded representation of the data array that is to be decoded in the manner described above may be implemented either in hardware or software, as desired. Thus, for example, the encoder may comprise a suitable processor or processors, controller or controllers, functional units, (encoding) circuits/circuitry, processing logic, microprocessor arrangements, etc., that are operable to perform the various encoding steps or functions, etc., as described herein such as appropriately dedicated hardware elements (processing circuits/circuitry) and/or programmable hardware elements (processing circuits/circuitry) that can be programmed to operate in the desired manner.

Similarly, the decoder can be implemented in hardware or software, as desired. Thus, for example, the decoder may comprise a suitable processor or processors, controller or controllers, functional units, (decoding) circuits/circuitry, processing logic, microprocessor arrangements, etc., that are also operable to perform the various encoding steps or functions, etc., as described herein such as appropriately dedicated hardware elements (processing circuits/circuitry) and/or programmable hardware elements (processing circuits/circuitry) that can be programmed to operate in the desired manner.

The various steps or functions, etc., of the technology described herein described herein may be duplicated and/or carried out in parallel on a given processor. Equally, the various processing stages may share processing circuits/ circuitry, etc., if desired.

Subject to any hardware necessary to carry out the specific steps or functions, etc., discussed above, the system can otherwise include any one or more or all of the usual functional units, etc., that data processing apparatus and/or systems include.

The various data processing stages can accordingly be implemented as desired and in any suitable manner, and can perform any desired and suitable functions, respectively. Similarly, the various data can be defined and stored in any suitable and desired manner.

It will also be appreciated by those skilled in the art that all of the described embodiments of the technology described herein described herein can, and in an embodiment do, include, as appropriate, any one or more or all of the features described herein.

The methods in accordance with the technology described herein described herein may be implemented at least partially using software e.g. computer programs. Thus, further embodiments the technology described herein described herein comprise computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processor. The data processor may be a microprocessor system, a programmable FPGA (field programmable gate array), etc.

The technology described herein described herein also extends to a computer software carrier comprising such software which when used to operate a data processing apparatus or system comprising a data processor causes in conjunction with said data processor said apparatus or system to carry out the steps of the methods of the technology described herein described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein described herein need be carried out by computer software and thus in further embodiments comprise computer software and such software installed on a computer software carrier for carrying out at least one of the steps of the methods set out herein.

The technology described herein described herein may accordingly suitably be embodied as a computer program product for use with a computer system. Such an implementation may comprise a series of computer readable instructions either fixed on a tangible, non-transitory medium, such as a computer readable medium, for example, diskette, CD, DVD, ROM, RAM, flash memory, or hard disk. It could also comprise a series of computer readable instructions transmittable to a computer system, via a modem or other interface device, either over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology described herein, present or future, including but not limited to, semiconductor, magnetic, or optical, or transmitted using any communications technology described herein, present or future, including but not limited to optical, infrared, or microwave. It is contemplated that such a computer program product may be distributed as a removable medium with accompanying printed or electronic documentation, for example, shrink wrapped software, pre-loaded with a computer system, for example, on a system ROM or fixed disk, or distributed from a server or electronic bulletin board over a network, for example, the Internet or World Wide Web.

The technology described herein relates particularly to methods for decoding data that has been encoded using a multi-level encoding scheme. An example of such a multi-level encoding scheme that can be used to generate encoded data packets to which the techniques of the technology described herein might be applied will first be described with reference to FIG. 1 to FIG. 1 shows schematically an exemplary original data array 30 that may be encoded in the manner of the technology described herein. The array of data 30 is a two-dimensional data array containing a plurality of data elements (i.e. containing data array entries at a plurality of particular positions within the array). The data array 30 could be any suitable and desired array of data, such as data representing an image.

In a graphics processing context, the data array could, for example, be a texture map (i.e. an array of texture elements (texels)), or an array of data representing a frame to be displayed (in which case the data array may be an array of pixels to be displayed). In the case of a texture map, each data entry (position) in the data array will represent an appropriate texel value (e.g. a set of colour values, such as RGBA, or luminance and chrominance, values for the texel). In the case of a frame for display, each data entry (position) in the array will indicate a set of colour values (e.g. RGB values) to be used for displaying the frame on a display.

In the technology described herein, the data array 30 is encoded and compressed to provide a set of data representing the data array 30 that can then be stored in memory, and from which set of data, the data values of individual data elements in the data array 30 can be derived by decoding the data representing the data array 30.

An example of the process for encoding and compressing the data array 30 will now be described.

In this example, as shown in FIG. 1, to encode and compress the data array 30, the data array 30 is first divided into a plurality of non-overlapping, equal size and uniform blocks 31, each block corresponding to a particular region of the data array 30. In the present embodiment, each block 31 of the data array corresponds to a block of 16×16 elements (positions) within the data array 30 (i.e. a block of 16×16 texels in the case of a texture map). (Other arrangements would, of course, be possible.)

Each such block 31 of the data array 30 is then encoded to provide a compressed representation of the block 32 of the data array 30.

To do this, a particular form of quadtree representation representing the block 31 of the data array 30 is first generated. This is done as follows.

The quadtree is constructed to have a root node that represents the whole of the data block 31 (thus the whole 16×16 block in the present embodiment). That root node then has four child nodes, each representing a respective non-overlapping, uniform and equal-size 8×8 sub-block 32 of the 16×16 block 31 of the data array 30. Each such 8×8 sub-block representing child node then itself has four child nodes, each representing a respective non-overlapping, uniform and equal-size 4×4 sub-block 33 of the 8×8 sub-block 32, and so on, down to the 16 leaf nodes of the quadtree that will each represent respective individual data elements of the 16×16 block 31 of the data array 30.

The data value for each node of the quadtree is determined by performing two processing (data) passes.

In the first processing pass in this embodiment, each leaf node of the quadtree is initialised with (set to) the value of the data element of the block 31 of the data array 30 that the leaf node corresponds to. Each non-leaf node is then initialised with (set to) the minimum value of its child nodes (to the value of its lowest value child node). This calculation is performed from the bottom up.

A second processing pass is then performed, in which each node except the root node (which has no parent) has the value of its parent node subtracted from it. This is again done from the bottom-up.

The node values following this second processing pass are then the node values to be used for each node of the quadtree representing the block 31 of the data array 30.

The effect of this process is that the value of the data element in the data array that a leaf node represents will be given by the sum of the value for the leaf node and of the values all the preceding nodes along the branch of the quadtree that the leaf node resides on (in other words, to determine the value of a data element that a leaf node of the quadtree represents from the quadtree representation of the data array, the value for the leaf node and of the values all the preceding nodes along the branch of the quadtree that the leaf node resides on must be summed (added together)).

Figure 2:
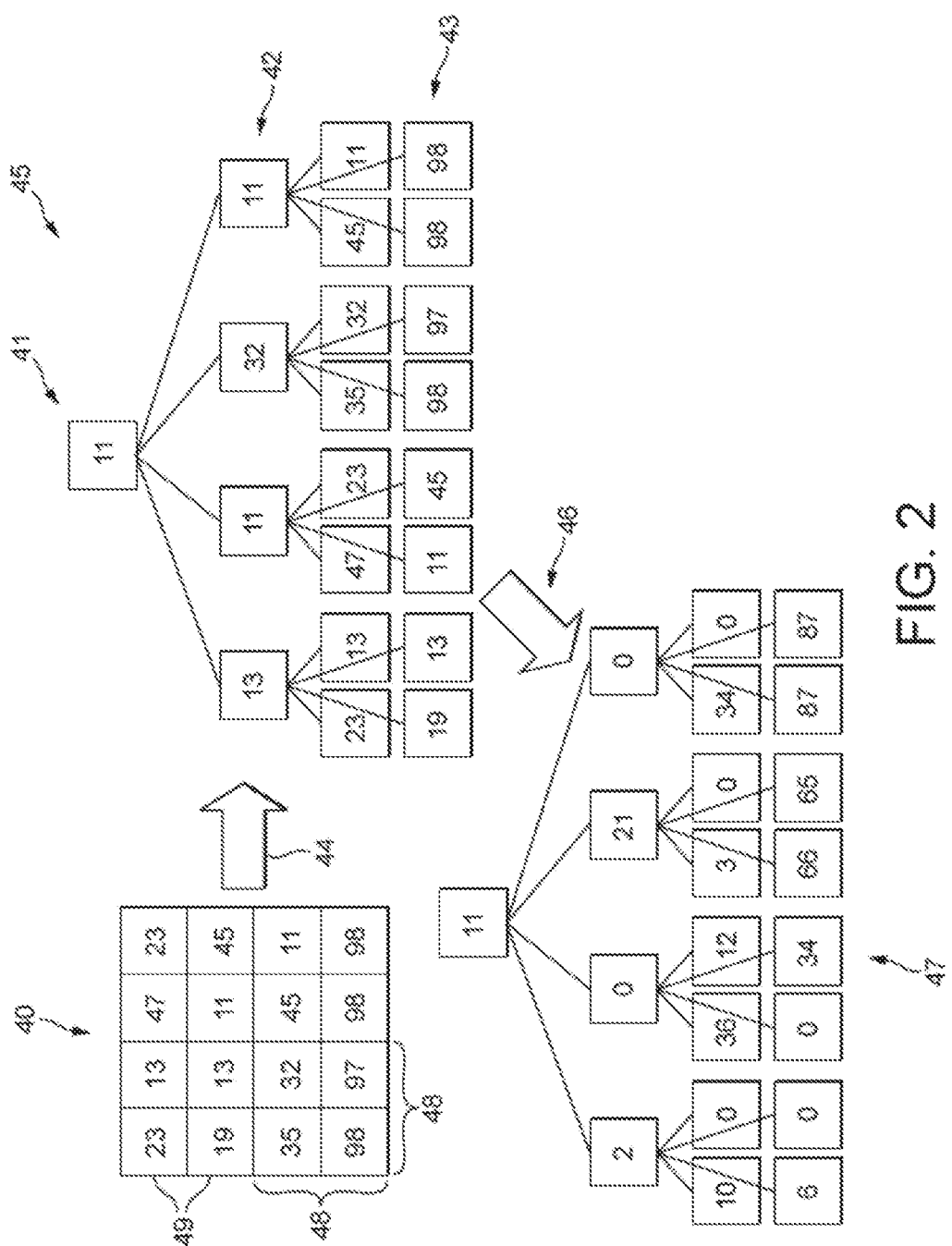
FIG. 2 shows schematically the generation of a quadtree representing an array of data elements in accordance with an embodiment of the technology described herein.

FIG. 2 illustrates the construction of such a quadtree for a representative 4×4 block 40 of data elements.

As shown in FIG. 2, the quadtree 45 representing the 4×4 array of data elements 40 has a root node 41, which has four child nodes 42, each corresponding to a respective 2×2 block 48 of the 4×4 block 40 of data elements. Each such child node 42 of the quadtree 45 then has 4 child nodes which form the leaf nodes 43 of the quadtree 45. The leaf nodes 43 of the quadtree 45 each correspond to a respective individual data element 49 of the 4×4 block 40 of data elements.

As shown in FIG. 2, and as discussed above, in a first processing pass 44 each of the leaf nodes 43 in the quadtree 45 is set to the value of its respective data element 49 in the block of data elements 40 (i.e. to the value of the data element 49 that the leaf node 43 corresponds to), and each non-leaf node 41, 42 in the tree 45 representing the data array 40 is set to the minimum value of its child nodes. This calculation is performed from the bottom-up.

Then, in a second processing pass 46, each node, except the root node 41 (which has no parent) has the value of its parent node subtracted from it. This is again done from the bottom-up.

The resulting node values 47 following this second processing pass are the node values for the tree representing the data array 40 that are stored to represent the data array 40.

Once the value to be stored for each node of the quadtree representing the block of the data array has been determined in the above manner, a set of data representing those node values (and from which the node values can be determined) is then generated (which data can then be stored as an encoded and compressed version of the original data array block 31).

In the present embodiment, this is done by generating and storing data indicating the difference between respective parent and child node values in the quadtree representing the block of the data array. In other words, the data value that is actually stored for a node of the quadtree representing the block of the data array in the data representing the quadtree indicates the difference between the value of the node in question and its parent node. Thus, for some or all of the nodes in the tree, data indicating the difference between the value for the node in the tree, and the value of its parent node is generated (and then stored in the stored data representing the tree).

The value for a given node in the tree will then correspondingly be determined from the stored representation of the tree by determining the value for the parent node of the node in question and adding the difference value indicated for the node of tree to the determined value for the parent node.

Thus, in the present embodiment, once a "minimum value" quadtree representing a block 31 of the original data array 30 to be encoded has been determined as discussed above, a set of data representing that quadtree to be stored as the representation of the quadtree from which the values of the data elements in the block 31 of the original data array 30 that the tree represents are to be determined is generated by determining the differences between the values of respective parent and child nodes in the quadtree, and then generating data representative of those difference values (and from which the difference values can derived), which data is then stored as the data representing the quadtree.

Figure 3:
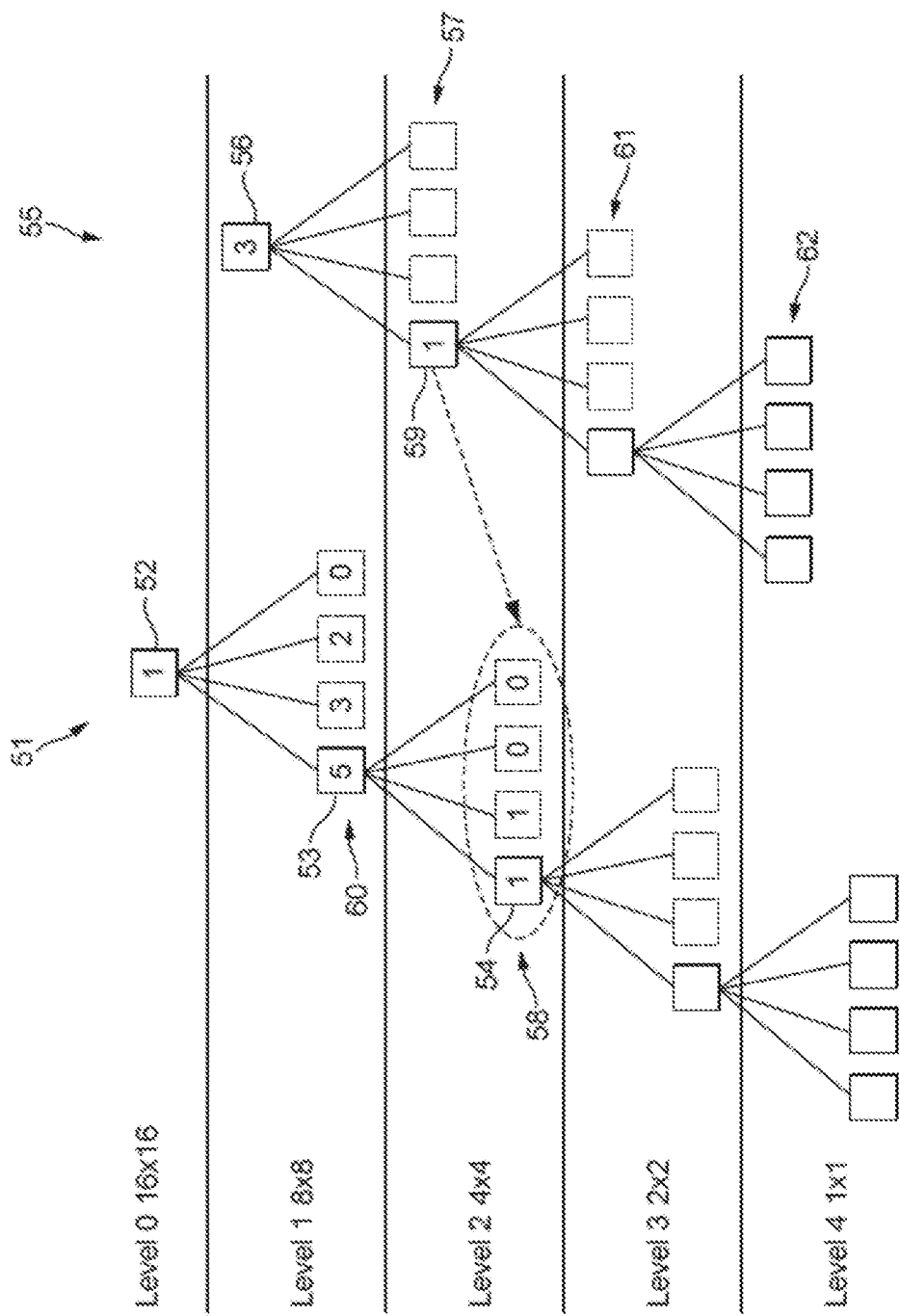
FIG. 3 shows schematically the use of difference values and a bit count quadtree to represent a quadtree representing a data array in an embodiment of the technology described herein.

The left-hand quadtree representation 51 in FIG. 3 shows, by way of illustration, the difference values that would be stored for some exemplary nodes of a quadtree representing an exemplary block of a data array. (FIG. 3 shows on the left-hand side respective exemplary difference values 51 to be stored for nodes of a quadtree representing a block of a data array (as discussed above), and on the right-hand side, a "bit count" quadtree 55 that indicates the amount of bits that have been used to signal the difference values in the quadtree to the left (this will be discussed in more detail below). The dotted line in FIG. 3 indicates the relationship between a node of the bit count tree 55 and the difference tree 51.)

As shown in FIG. 3, if it is assumed that the quadtree representing the data array has a root node value of 1 (following the generation of the node values using two processing passes as discussed above), the value to be stored for the root node 52 of the quadtree 51 that represents the 16×16 block of data elements will be set to 1.

If it is then assumed that the four child nodes 60 of that root node 52 have values 6, 4, 3 and 1, respectively, from left-to-right in FIG. 3, then the difference values that are accordingly stored for these child nodes 60 will be 5, 3, 2, and 0, respectively, as shown in FIG. 3. (For example, as the value for the root node of the quadtree representing the data elements is 1, and the first child node 53 of that root node 52 has a value 6, the difference to be stored is 5.)

Similarly, if the child nodes 58 of the first child node 53 of the root node 52 have values 7, 7, 6 and 6, respectively, from left-to-right in FIG. 3, the difference values that are accordingly stored for these child nodes 60 will be 1, 1, 0, and 0, respectively, as shown in FIG. 3.

Once the difference values to be stored for each node of the quadtree representing the block 30 of the data array have been determined (i.e. a quadtree of the form of the quadtree 51 shown on the left-hand side of FIG. 3 has been generated), a set of data representing that "difference value" quadtree is then generated using an entropy coding scheme.

The process used in the present embodiment basically determines how many bits are to be used to signal the respective difference values for the quadtree representing the data array. Once this has been done, a set of data representing the quadtree representing the block of the data array that uses the determined number of bits to signal the respective difference values is generated and stored to represent the node values of the quadtree representing the block of the data array.

Furthermore, to facilitate decoding of the stored data representing the node values of the quadtree, a set of data indicating the number of bits that have been used to signal the respective difference values, which is also in the form of a quadtree, is also generated and stored.

Thus the encoding and storage of the data representing the difference values for the nodes of the quadtree representing the block of the data array is based on a quadtree that is maintained in parallel with the tree representing the values of the data array, which quadtree represents (and allows to be derived) the number of bits that have been used to signal the differences for the children of a node of the quadtree representing the values of the data elements of the relevant block of the data array (and thus this parallel tree can accordingly be considered as a "bit count" tree).

This process will now be described with reference to FIG. 3, which shows in parallel to the quadtree 51 representing the node values of the quadtree representing the data elements of the block of the data array, a bit count quadtree 55 which indicates how many bits have been used to signal the difference values for the respective node values in the quadtree 51.

As shown in FIG. 3, the bit count quadtree 55 is constructed to have a root node 56 that indicates how many bits have been used to signal the difference between the value of the root node of the quadtree 51 representing the data array and each of its child nodes. Thus, in the example shown in FIG. 3, the root node 56 of the bit count quadtree 55 has a value 3, indicating that three bits have been used to signal the difference values for the child nodes 60 of the root node 52 of the quadtree 51 representing the data array (i.e. that three bits have been used to signal each such difference value that is indicated explicitly in the data representing the quadtree node values). This bit count quadtree root node 56 is set to indicate that three bits are used, because the highest difference between the root node 52 and one of its child nodes 60 in the quadtree representing the values of the data elements is 5 (for the child node 53), thereby requiring three bits to indicate that difference value.

It should be noted here that each difference value for the child nodes 60 of the root node 52 that is included explicitly in the data representing the node values of the quadtree representing the block of the data array will be signalled using three bits (as that is the bit count indicated by the root node 56 of the bit count quadtree 55), even if the actual difference value does not require as many as three bits to signal. Any redundant bits will be padded using zeros. This is the case for each respective bit count value indicated by a node of the bit count tree 55.

The next level down 57 in the bit count quadtree 55 has set as its node values the respective number of bits that have been used to signal the difference between each respective child node 60 of the root node of the quadtree indicating the data values and its child nodes. Thus, for example, because one bit is sufficient to signal all the differences between the child nodes 58 of the node 53 in the quadtree 51, the corresponding node 59 of the bit count quadtree 55 is set to 1 (as shown by the dashed line in FIG. 3).

It should be noted here that there is no need to include in the bit count tree a value indicating the number of bits that are used for the root node value of the tree representing the block of the data array, because the value for that root node is signalled using the number of bits that is required to write an uncompressed value for the component of the data array in question (i.e. if the data array uses 8-bit component, such as colour, values, then the root node value for the root node of the tree representing the values of the data array will be signalled using 8 bits). As the size (i.e. number of bits) used for the uncompressed components in the data array will be known, the number of bits used for the root node will accordingly be known.

Although FIG. 3 only shows the values for certain nodes in the bit count quadtree 55 and the quadtree 51 representing the data values of the data array, as will be appreciated, in practice each bit count quadtree node and each node of the quadtree representing the values of the data array will have a value that will be set and determined in the manner of the present embodiment.

In the present embodiment, the bit count quadtree 55 is encoded for storage by again storing the differences between node values in the bit count tree, rather than their actual values, as follows.

Firstly, the actual value of the root node for the bit count tree is stored for that node (i.e. the root node 56 of the bit count tree 55 is uncompressed). The number of bits used to signal the value of this node in the data representing the bit count quadtree is set to the number of bits that will be needed for the largest possible bit count that the root node of the bit count quadtree could be required to indicate. (For example, the bit count tree root node for a data array that uses 8-bit components will be sent as a 4-bit value, so that that root node of the bit count tree can indicate any value (any number of bits) between 0 and 8, since the largest possible difference between the root node and its child nodes in the data value indicating tree where 8-bit component values are being used will be 255, which would accordingly require 8 bits to signal (encode).)

Thus, for example, in the case of encoding a data array that uses 8-bit component values, the root node for the tree representing the data array values will be sent as an 8-bit value, indicating any number between 0 and 255. If the largest difference then to the 8×8 level is 23, the root node of the bit count tree will be set to the value 5, to indicate that 5 bits are needed (and used) in the data representing the tree representing the node values to represent that difference value of 23. The root bit count node value of 5 will be represented in the data representing the bit count tree using 4 bits (as the largest possible difference value when using 8-bit component values between respective levels in the tree representing the node values will be 255, which would require 8 bits to indicate, and so the root node of the bit count tree must contain enough bits to signal a value up to 8, i.e. 4 bits).

Then, the difference between the amount of bits required between the root 16×16 level and the 8×8 child node first level in the quadtree representing the data values and the amount of bits required between each 8×8 level node in the quadtree representing the data values and its child 4×4 nodes (which can be thought of as a level 2 bit count) is sent as a 2-bit signed value [−2, 1] (i.e. the value for the bit count quadtree for the child nodes 57 of the root node 56 of the bit count quadtree shown in FIG. 3 is indicated by using a signed 2-bit value to indicate the difference between the bit count of the respective child node 57 and the parent root node 56).

The same is then done for each successive level of the bit count quadtree 55. Thus, again, the bit counts for the next levels 61 and 62 in the bit count quadtree are each indicated using signed 2-bit values to indicate the difference between the bit count to be indicated by the respective child node 57 and the parent root node 56, and so on.

The above describes the layout and configuration of the bit count tree 55 and of the data that is stored for representing the bit count tree 55 in the present embodiment. The actual bit count tree values to use are determined as follow.

Firstly, once the (difference) value to be stored for each node of the tree representing the data array has been determined, as discussed above, the number of bits (the bit count) needed to indicate the respective (difference) value of each node of the tree representing the data array is determined.

However, in the present embodiment, these bit count values are not simply then used as the node values to be stored for (to populate) the bit count tree, because the Applicants have recognised that as the present embodiment uses a constrained, and fixed, number of bits (namely a 2-bit signed value) to indicate the bit counts for the respective nodes of the bit count tree, then the actual bit count (number of bits) required for indicating the value of a given node of the tree representing the data array may in fact be smaller or larger than what it is possible to signal with the fixed size bit count field to be used in the representation of the bit count tree.

To take account of this, the bit count quadtree 55 in this example is constrained to make sure that the bit count to be signalled for each respective node in the bit count quadtree other than the root node is no smaller than the bit count of the node's largest child node minus one, and no smaller than the bit count of the node's parent node minus two.

This is achieved in the following manner. First, each node in the bit count quadtree is initialised to its "true" bit count value. Then, a first bottom-up pass is performed in which the bit count for each node of the bit count quadtree, except the root node, is constrained to be no smaller than the bit count of its largest child node minus 1. This is done by increasing the node's "true" bit count by whatever amount is necessary to satisfy the constraint.

Following this first pass, a top-down pass is then performed in which the current bit count for each node is constrained to be no smaller than the bit count of its parent node minus 2. This is again done by increasing the node's current bit count by whatever amount is necessary to satisfy the constraint.

The resulting node bit count values following the second pass are then the values that are associated with (set for) each node in the bit count tree. A set of data representing (encoding) the bit count tree in the manner discussed above is then generated and stored.

Once the bit count tree has been derived in this manner, the data representing the node values for the tree representing the data array can be generated and stored, using the configuration (and in particular the node value bit counts (field sizes)) corresponding to, and indicated by, the bit count tree. Thus the data representing the node values of the tree representing the data array will be configured such that for each node, the number of bits that is used to signal the difference value for that node in the data representing the node values of the tree representing the data array is the number of bits that the bit count tree indicates.

The effect of this then is that the data representing the node values of the tree representing the data array will be configured such that for each node, the number of bits that is used to signal the difference value for that node in the data representing the node values of the tree representing the data array is a number of bits (a bit count) that can be indicated using the fixed configuration of the bit count tree.

As in this arrangement the set of data representing the node values of the tree representing the data array must use the number of bits indicated by the bit count tree for respective node values, if necessary the stored data representing the node values is padded with zeros (or some other recognisable "dummy" bits) to achieve this.

The root node value in the set of data representing the node values of the tree representing the data array is signalled in this embodiment using the same amount (number) of bits as are used in the input data element format for the data array. As this number of bits is not signalled by the bit count tree, if necessary this number of bits used in the input data element format may be communicated to the decoder in some other way.

In operation to encode a data array 30 in the manner described above, the data for the data array can be processed in any suitable and desired manner. For example, a suitable processor or processing circuitry may read the original data array to be compressed from memory, and/or receive a stream of data corresponding to the original data array to be compressed, and then process the stream of data accordingly, e.g. divide it into blocks, generate the necessary quadtrees, and then generate data representing the quadtree(s) and store that tree-representing data in memory, e.g. in memory and/or on a removable storage medium, etc.

The so-generated set of data representing the tree node values and the set of data representing the corresponding bit count tree will then be stored appropriately for use as a compressed set of data representing the data array.

The above primarily describes the way in the present embodiment that the encoded representation of the data array is generated and stored in memory for use. When the so-stored data array comes to be used, for example to apply to fragments to be rendered (where the stored data array is a texture map for use in graphics processing), then the reading and decoding processes for the stored data array will essentially comprise the reverse of the above storing and encoding processes.

Thus, the decoding device, such as a graphics processor (e.g. where the stored data array is texture map) or a display controller (e.g., where the stored data array is a frame to be displayed), will first identify the position(s) of the particular element or elements in the data array that are of interest (i.e., whose values are to be determined). The decoding process will essentially be the reverse of the above-described encoding process. Thus, once the decoder has loaded the necessary data relating to a sub-block that is to be decoded, it will first determine the required bit count tree node values from the stored data representing the bit count tree, and then use those determined bit count tree node values to identify the data for the relevant nodes of the quadtree representing the values of the data elements of the block of the data array of interest, and use those node values to determine the value of the data element or elements of interest.

This process can then be repeated for each data element of interest (whose value is required). In this way it is possible to obtain a lossless reproduction of the original, uncompressed data values.

However, the present Applicants have recognised that in some cases it may be desirable to obtain lower-resolution, e.g. downscaled, reproductions of the original data array. A typical example of where this might be the case would be when generating texture "mipmaps". However, other arrangements would of course be possible.

In that case, rather than attempting to fully decode the encoded representation of the data array, down to the level of the leaf nodes, in the present embodiments the decoding is effectively truncated at the desired level of the tree, with the contributions from the tree nodes at the lower levels of the tree then being approximate using the bit count data.

Figure 4:
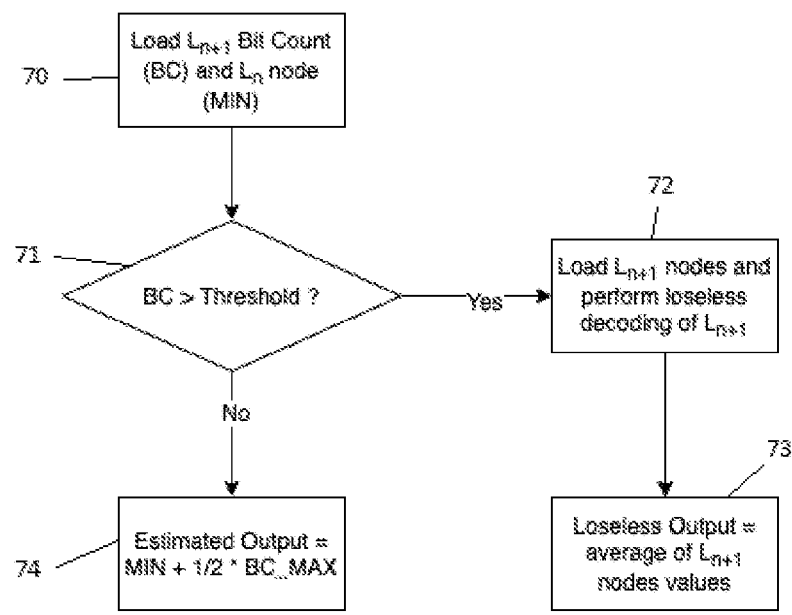
FIG. 4 is a flowchart illustrating a decoding method according to an embodiment.

This approach is described with reference to FIG. 4 which is a flowchart showing how a downscaled reproduction at a level 'Ln+1' can be obtained. For ease of illustration, an example will now be described with reference to a single node at the Ln level having a plurality of child nodes at the Ln+1 level. However, it will be appreciated that this may be performed for each set of child nodes at the Ln+1 level (i.e. for each of the parent nodes at the Ln level) in order to determine a downscaled representation of the overall data array.

Firstly, at step 70, the tree node values for the parent node at the Ln level and all of its preceding parent nodes in the higher (Ln−1, etc.) levels of the tree are summed to obtain a data value for the parent node at the Ln level. As discussed above, this represents a minimum (MIN) value for the respective child nodes at the Ln+1 level. At the same time, the bit count data for the first node, i.e. the number of bits used to signal the respective child nodes at the Ln+1 level, is also obtained (step 70), along with the bit count data for any lower-level child nodes (if the child nodes at the Ln+1 level are not leaf nodes). It is then checked whether the bit count for the child nodes at the Ln+1 level, and for any lower levels, exceeds a certain threshold (step 71). If the bit count is too high (step 71—Yes), it may be better to fully decode the level Ln+1 of the tree, and in that case the Ln+1 nodes can then be obtained (step 72) and losslessly decoded, e.g. in the manner described above, to determine the data values for the child nodes at the Ln+1 level (step 73).

On the other hand, if the bit count is less than the threshold (step 71—No), an estimated output for the child nodes at the Ln+1 level is determined (step 74).

In the present embodiment the estimated output for all of the of the child nodes of the first node at the Ln+1 level is estimated using a function, C=MIN+0.5*BC_MAX, wherein MIN is the data value obtained for the parent node at the Ln level and BC_MAX is the maximum value that would be representable based on the bit count used for signalling the child nodes at the Ln+1 level and any child nodes at lower levels of the tree. However, other functions could of course be used.

For example, returning to the example shown in FIG. 3, and considering the set of child nodes 58 in the 4×4 Level 2 of the quadtree 51, it can be seen that the parent node 53 in the higher level of the quadtree has a MIN value of 6 (i.e. 1+5). The bit count tree 55 indicates that one bit is sufficient to signal all the differences between the child nodes 58 of the node 53 in the quadtree 51. Thus, the maximum value that could be represented using this one bit would be 1. So, using the formula above, the data values for each of the child nodes 58 at the 4×4 Level 2 of the quadtree 51 are set to, C=6+0.5*1=7. This data value can then be used for each of the data elements associated with the parent node 53, i.e. all of the 1×1 leaf nodes at Level 4 of the tree for which the node 53 is part of their respective branch.

This can of course be repeated for any other parent nodes in the quadtree 51, at any desired level of the quadtree 51, in order to determine a suitably downscaled representation of original data elements directly from the quadtree 51 and the bit count tree 55, without having to extract and process the node values at each level of the tree.

Figure 5:
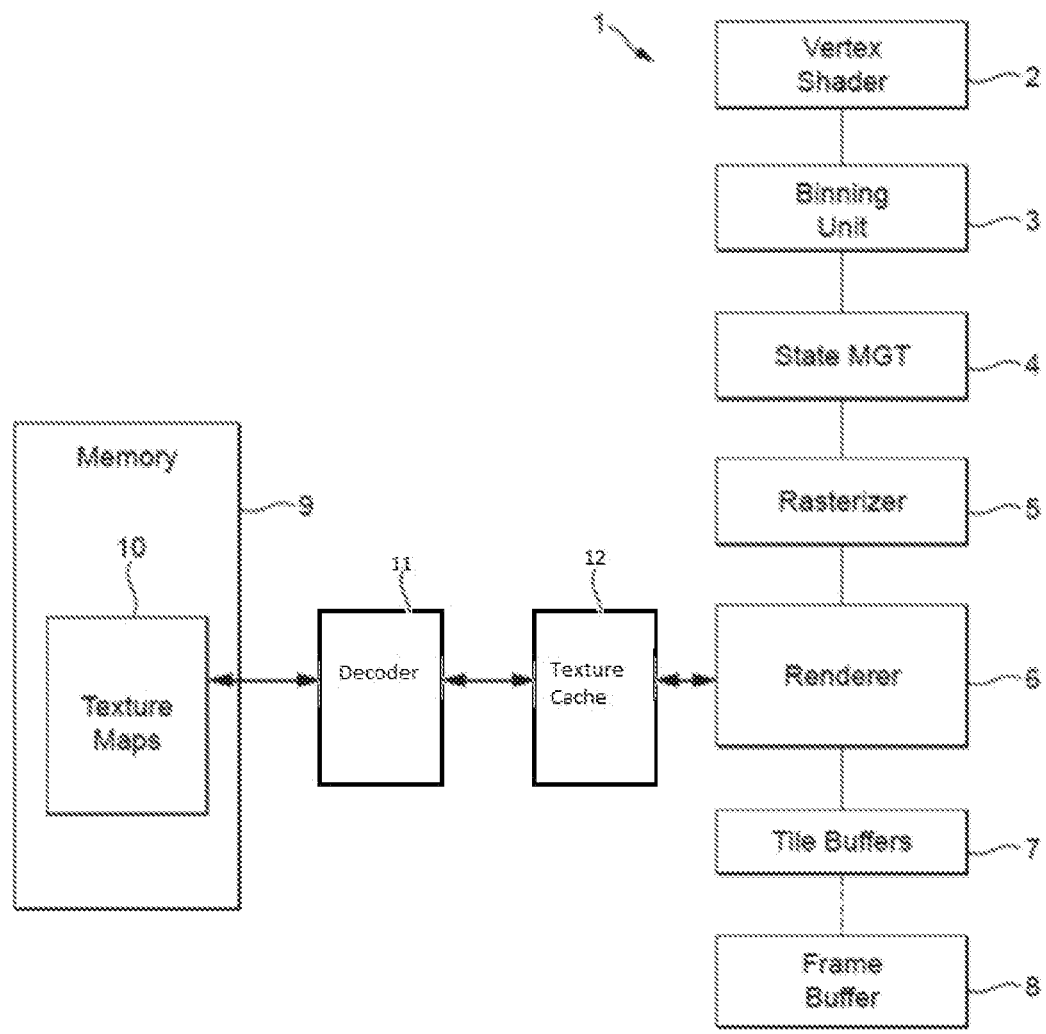
FIG. 5 shows schematically a graphics processing system that may use data arrays encoded in accordance with the technology described herein.

FIG. 5 shows schematically an arrangement of a graphics processing system 1 that can store and use data arrays that have been stored in the manner of the present embodiments.

FIG. 5 shows a tile-based graphics processing system. However, as will be appreciated, and as discussed above, the technology described herein can be implemented in other arrangements of graphics processing system as well (and, indeed, in other data processing systems).

The system includes, as shown in FIG. 5, a tile-based graphics processor (GPU) 1. This graphics processor 1 generates output data arrays, such as output frames intended for display on a display device, such as a screen or printer, in response to instructions to render graphics objects, etc. that it receives.

As shown in FIG. 5, the graphics processor 1 includes a vertex shader 2, a binning unit 3, a state management unit 4, a rasteriser 5, and a renderer 6 in the form of a rendering pipeline.

The vertex shader 2 receives descriptions of graphics objects to be drawn, vertices, etc., e.g. from a driver (not shown) for the graphics processor 1, and performs appropriate vertex shading operations on those objects and vertices, etc., so as to, for example, perform appropriate transform and lighting operations on the objects and vertices.

The binning unit 3 sorts (bins) the various primitives, objects, etc., required for an output to be generated by the graphics processor 1 (such as a frame to be displayed) into the appropriate bins (tile lists) for the tiles that the output to be generated is divided into (since, as discussed above, this exemplary graphics processing system is a tile-based graphics processing system).

The state management unit 4 stores and controls state data and the state of the graphics processing unit to control the graphics processing operation.

The rasteriser 5 takes as its input primitives to be displayed, and rasterises those primitives to sampling positions and fragments to be rendered.

The rendering pipeline 6 takes fragments from the rasteriser 5 and renders those fragments to generate the output data (the data for the output (e.g. frame to be displayed) of the graphics processor 1).

The rendering pipeline will include a number of different processing units, such as fragment shaders, blenders, texture mappers, etc.

In particular, as shown in FIG. 5, the rendering unit 6 will, inter alia, access texture maps 10 stored in a memory 9 that is accessible to the graphics processor 1, so as to be able to apply the relevant textures to fragments that it is rendering. The memory 9 where the texture maps 10 are stored may be an on-chip buffer or external memory (e.g. main system memory) that is accessible to the graphics processor 1.

The graphics processor 1 generates its output data arrays, such as output frames, by generating tiles representing different regions of a respective output data array (as it is a tile-based graphics processor). Thus, the output from the rendering pipeline 6 (the rendered fragments) is output to tile buffers 7.

The tile buffers' outputs are then written to a frame buffer 8, e.g. for display. The frame buffer 8 may reside, e.g. in main memory (which memory may be DDR-SDRAM) of the system (not shown). The data from the tile buffers may be downsampled before it is written to the frame buffer, if desired.

The texture maps 10 and the frame buffer 8 may be stored in the same physical memory, or they may be stored in different memories, as desired.

Sometime later, the data array in the frame buffer 3 will be read by a display controller and output to a display device for display (not shown).

The graphics processing system shown in FIG. 5 uses the data array encoding and decoding and storing arrangement of the embodiments described above in respect of both the stored texture maps 10 in the memory 9, and when storing its output data in the frame buffer 8.

Thus, each texture map 10 that is stored in the memory 9 for use by the rendering unit 6 is stored in the form described above. Accordingly, when the rendering unit 6 needs to access a texture map, it will read and decode the texture map data in the manner described above.

As described above, the texture maps 10 are stored in an encoded fashion, The texture maps 10 are thus read out from memory 9 into a decoder 11 that acts to determine the required texture values which are then written into a suitable texture cache 12 for access by the renderer 6.

When processing such texture data, it is known to store a series of progressively lower resolution (i.e. downscaled) representations of the same image (referred to as texture "mipmaps") in order to improve the rendering speed and/or reduce the processing burden on the renderer (circuit) of the graphics processor. Traditionally these are obtained by fully decoding the texture map, and then performing subsequent downsampling, as required. However, using the decoding scheme of FIG. 4, it is possible to extract such texture mipmaps directly from the quadtree, e.g. during the decoding process, which can help reduce the processing burden.

Similarly, when the generated output data from the graphics processor 1 is written to the frame buffer 8 from the tile buffer 7, that data is processed in the manner described above, to take the data from the tile buffers 7 and store it in the format of some embodiments of the technology described herein in the frame buffer 8. This data can then be read and decoded from the frame buffer 8 in the manner described above by, e.g., the display controller (not shown) of the display on which the frame is to be displayed.

It will be appreciated that each of the stages, elements, and units, etc., of the graphics processor as shown in FIG. 5 may be implemented as desired and will accordingly comprise, e.g., appropriate circuits/circuitry, and/or processing logic, programmable logic, etc., for performing the necessary operations and functions, and will provide the appropriate control and processing circuits/circuitry, etc., for performing the technology described herein.

It will also be appreciated here that FIG. 5 simply shows the arrangements schematically, and thus, for example, the data flow in operation of the technology described herein need not and may not be as shown in FIG. 5, but may, for example, involve the looping back of data as between the various units and stages shown in FIG. 5 as appropriate.

A number of modifications and variations to the above described embodiments of the technology described herein would be possible.

Also, although the present embodiments have been described above with particular reference to the use of the techniques of the present embodiment with graphics processors and display controllers, the techniques of the technology described herein can be used for other data array processing and in particular for other image processing arrangements.

For example, the techniques of the technology described herein may be used in image signal processors and video decoders and encoders (MPEG/h.264, etc.). In these cases, the techniques of the technology described herein could be used, for example, to encode an image generated by an image signal processor which is processing data received from an image sensor to make a watchable image out of it. A video encoder/decoder could, for example, decode images (video frames) encoded in the form of the technology described herein to then compress the image using some other standard like h.264, and correspondingly encode frames of video data using the technique of the technology described herein for provision, for example, to a graphics processor or a display controller.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of determining a data value for a data element or set of data elements of an array of data elements from an encoded representation of the array of data elements, wherein the encoded representation of the array of data elements represents the array of data elements using a tree structure, the tree structure including a plurality of branches associated with a respective plurality of leaf nodes, and each branch extending over a plurality of levels from a root node at a top level of the tree to the respective leaf node of the branch at the lowest level of the tree, such that each leaf node has a set of one or more preceding parent node(s) in the branch of the tree that the leaf node belongs to, the tree being configured such that each leaf node of the tree represents a respective data element of the data array, and the node values for the nodes at each level of the tree being set such that the data value that the tree indicates for the data element of the data array that a leaf node of the tree represents is determined as a function of the node values in the tree for the leaf node and the preceding parent node(s) in the branch of the tree that the leaf node belongs to, wherein the encoded representation of the array of data elements comprises a set of tree node data representing the respective node values for the different nodes of the tree and a set of bit count data indicating the number of bits that has been used for signaling the node values for each non-root node in the tree, the method comprising:

determining a data value for use by a data processing system for a set of one or more data elements associated with a first node of the tree structure representing the array of data elements, the first node having a plurality of child nodes in the tree and the first node thereby being associated with a set of one or more data elements, wherein the data value for the set of one or more data elements associated with the first node is determined by:

using the stored bit count data to determine the number of bits used for signaling the node values for the child nodes of the first node in the next level of the tree;

using the stored tree node data for the first node and all of its preceding parent node(s) in the tree to determine an initial data value for the first node, the initial data value for the first node being determined as a function of the node values for the first node and all of its preceding parent node(s) in the tree; and determining a data value for use by a data processing system for the set of one or more data elements associated with the first node by modifying the initial data value for the first node obtained from the node values for the first node and all of its preceding parent node(s) in the tree using a modifier value based on the determined number of bits used for signaling the node values for the child nodes of the first node in at least the next level of the tree.

2. The method of claim 1, further comprising checking the number of bits used for signaling the node values for child nodes of the first node, and wherein when the number of bits used for signaling the node values for child nodes of the first node is less than or equal to a threshold value, proceeding to use the stored tree node data to determine the initial data value for the first node, and to determine the data value for the child nodes of the first node by modifying the initial data value using the modifier value based on the number of bits used for signaling the node values for the child nodes of the first node in at least the next level of the tree.

3. The method of claim 2, wherein when the number of bits used for signaling the first node is greater than the threshold value, the method comprises determining individual data values for the child nodes of the first node as a function of the child node value and the node values of the preceding parent nodes in the tree.

4. The method of claim 1, wherein the node values for the nodes at each level of the tree being set such that the data value that the tree indicates for the data element of the data array that a leaf node of the tree represents is determined as a sum of the node values in the tree for the leaf node and the preceding parent node(s) in the branch of the tree that the leaf node belongs to.

5. The method of claim 4, wherein the modifier value is based on half of the maximum value that could be signaled using the respective bit count for the child nodes of the first node.

6. The method of claim 1, wherein the array of data elements is an array of texture data.

7. The method of claim 1, comprising determining a set of node values for a plurality of nodes at a particular level in the tree to determine one or more downscaled representations of the array of texture data.

8. The method of claim 1, wherein the bit count data is stored using a tree representation.

9. A non-transitory computer readable storage medium storing software code that when executing on a data processor performs a method of determining a data value for a data element or set of data elements of an array of data elements from an encoded representation of the array of data elements, wherein the encoded representation of the array of data elements represents the array of data elements using a tree structure, the tree structure including a plurality of branches associated with a respective plurality of leaf nodes, and each branch extending over a plurality of levels from a root node at a top level of the tree to the respective leaf node of the branch at the lowest level of the tree, such that each leaf node has a set of one or more preceding parent node(s) in the branch of the tree that the leaf node belongs to, the tree being configured such that each leaf node of the tree represents a respective data element of the data array, and the node values for the nodes at each level of the tree being set such that the data value that the tree indicates for the data element of the data array that a leaf node of the tree represents is determined as a function of the node values in the tree for the leaf node and the preceding parent node(s) in the branch of the tree that the leaf node belongs to, wherein the encoded representation of the array of data elements comprises a set of tree node data representing the respective node values for the different nodes of the tree and a set of bit count data indicating the number of bits that has been used for signaling the node values for each non-root node in the tree, the method comprising:

determining a data value for use by a data processing system for a set of one or more data elements associated with a first node of the tree structure representing the array of data elements, the first node having a plurality of child nodes in the tree and the first node thereby being associated with a set of one or more data elements, wherein the data value for the set of one or more data elements associated with the first node is determined by:

using the stored bit count data to determine the number of bits used for signaling the node values for the child nodes of the first node in the next level of the tree;

using the stored tree node data for the first node and all of its preceding parent node(s) in the tree to determine an initial data value for the first node, the initial data value for the first node being determined as a function of the node values for the first node and all of its preceding parent node(s) in the tree; and determining a data value for use by a data processing system for the set of one or more data elements associated with the first node by modifying the initial data value for the first node obtained from the node values for the first node and all of its preceding parent node(s) in the tree using a modifier value based on the determined number of bits used for signaling the node values for the child nodes of the first node in at least the next level of the tree.

10. A decoder for determining a data value for a data element or set of data elements of an array of data elements for use in a data processing system from an encoded representation of the array of data elements, wherein the encoded representation of the array of data elements represents the array of data elements using a tree structure, the tree structure including a plurality of branches associated with a respective plurality of leaf nodes, and each branch extending over a plurality of levels from a root node at a top level of the tree to the respective leaf node of the branch at the lowest level of the tree, such that each leaf node has a set of one or more preceding parent node(s) in the branch of the tree that the leaf node belongs to, the tree being configured such that each leaf node of the tree represents a respective data element of the data array, and the node values for the nodes at each level of the tree being set such that the data value that the tree indicates for the data element of the data array that a leaf node of the tree represents is determined as a function of the node values in the tree for the leaf node and the preceding parent node(s) in the branch of the tree that the leaf node belongs to, wherein the encoded representation of the array of data elements comprises a set of tree node data representing the respective node values for the different nodes of the tree and a set of bit count data indicating the number of bits that has been used for signaling the node values for each non-root node in the tree, the decoder comprising:

a bit count reading circuit configured to:

for a first node of the tree structure representing the array of data elements, the first node having a plurality of child nodes in the tree and thereby being associated with a set of one or more data elements of the array of data elements represented by the tree, use the stored bit count data to determine the number of bits used for signaling the node values for the child nodes of the first node in the next level of the tree; and a decoding circuit configured to:

use the stored tree node data for the first node and all of its preceding parent node(s) in the tree to determine an initial data value for the first node, the initial data value for the first node being determined as a function of the node values for the first node and all of its preceding parent node(s) in the tree; and determine a data value for use by a data processing system for the set of one or more data elements associated with the first node by modifying the initial data value for the first node obtained from the node values for the first node and all of its preceding parent node(s) in the tree using a modifier value based on the determined number of bits used for signaling the node values for the child nodes of the first node in at least the next level of the tree.

11. The system of claim 10, wherein the decoding circuit is further configured to: check the number of bits used for signaling the node values for the child nodes of the first node, and wherein when the number of bits used for signaling the node values for the child nodes of the first node is less than or equal to a threshold value, the decoding circuit proceeds to use the stored tree node data to determine the initial data value for the first node, and to determine the data value for the child nodes of the first node by modifying the initial data value using a modifier value based on the number of bits used for signaling the node values for the child nodes of the first node in at least the next level of the tree.

12. The system of claim 11, wherein when the number of bits used for signaling the first node is greater than the threshold value, the decoding circuit proceeds to determine individual data values for the child nodes of the first node as a function of the child node value and the node values of the preceding parent nodes in the tree.

13. The system of claim 10, wherein the modifier value is based on half of the maximum value that could be signaled using the respective bit count for the child nodes of the first node.

14. The system of claim 10, wherein the array of data elements is an array of texture data.

15. The system of claim 10, wherein the decoding circuit is configured to determine a set of node values for a plurality of nodes at a particular level in the tree to determine one or more downscaled representations of the array of texture data.

16. The system of claim 10, wherein the bit count data is stored using a tree representation.

17. The system of claim 10, wherein the node values for the nodes at each level of the tree being set such that the data value that the tree indicates for the data element of the data array that a leaf node of the tree represents is determined as a sum of the node values in the tree for the leaf node and the preceding parent node(s) in the branch of the tree that the leaf node belongs to.

* * * * *